(12) United States Patent
Bayley et al.

(10) Patent No.: US 9,170,148 B2
(45) Date of Patent: Oct. 27, 2015

(54) SOAP DISPENSER HAVING FLUID LEVEL SENSOR

(75) Inventors: Graeme S. Bayley, Brookfield, WI (US); Richard G. Dykowski, Waukesha, WI (US); Kevin M. Kohlwey, Port Washington, WI (US); Jason M. Renner, Greenfield, WI (US)

(73) Assignee: Bradley Fixtures Corporation, Menomonee Falls, WI (US)

( * ) Notice: Subject to any disclaimer, the term of this patent is extended or adjusted under 35 U.S.C. 154(b) by 1200 days.

(21) Appl. No.: 13/088,512

(22) Filed: Apr. 18, 2011

(65) Prior Publication Data

US 2012/0260729 A1     Oct. 18, 2012

(51) Int. Cl.
*G01F 23/36* (2006.01)

(52) U.S. Cl.
CPC .................................. *G01F 23/363* (2013.01)

(58) Field of Classification Search
CPC ... G01F 23/363; G01F 23/36; G01F 23/0076; G01F 23/32; G01F 23/34; H01H 35/186; H01H 29/20; A47K 5/12; F17C 2250/0413; G01M 3/3245
USPC .............. 73/290 R, 293, 305, 307, 314, 317, 73/322.5, 290 B
See application file for complete search history.

(56) References Cited

U.S. PATENT DOCUMENTS

| | | | |
|---|---|---|---|
| 540,235 A | 6/1895 | Clifford et al. | |
| 937,509 A | 10/1909 | Carpenter | |
| 1,069,972 A | 8/1913 | Metzaer | |
| 1,323,398 A | 12/1919 | Leland | |
| 1,419,712 A | 6/1922 | Bassette | |
| 1,423,800 A | 7/1922 | Hibbard et al. | |
| 1,494,883 A | 5/1924 | Bassette et al. | |
| 1,578,047 A | 3/1926 | Lum | |
| 1,579,705 A | 4/1926 | Hewitt | |
| 1,616,313 A | 2/1927 | Farmer | |
| 1,659,851 A | 2/1928 | Brewington | |
| 1,750,094 A | 3/1930 | Emmrich | |
| 1,765,915 A | 6/1930 | Haase | |
| 1,816,055 A | 7/1931 | Pfeifer | |
| 2,008,183 A | 2/1934 | McCord | |
| 1,961,179 A | 6/1934 | Tinkham | |
| 2,027,605 A | 1/1936 | McCord et al. | |

(Continued)

FOREIGN PATENT DOCUMENTS

| AU | 2005203363 | 2/2006 |
|---|---|---|
| AU | 2006274708 | 2/2007 |

(Continued)

OTHER PUBLICATIONS

International Search Report Mailed Jun. 7, 2009 for PCT/US2008076875.

(Continued)

*Primary Examiner* — Daniel S Larkin
*Assistant Examiner* — Jamar Ray
(74) *Attorney, Agent, or Firm* — Boyle Fredrickson, S.C.

(57) ABSTRACT

A fill level sensor for a liquid soap container or vessel has a float-bearing arm and an accelerometer that is attached to a surface of the arm to detect changes in the volume of liquid soap in the container. A feedback system then conveys fill status information based on the output of the accelerometer, such as to service personnel who may be responsible for replenishing the supply of liquid soap in the container.

14 Claims, 7 Drawing Sheets

(56) References Cited

U.S. PATENT DOCUMENTS

| | | |
|---|---|---|
| 2,041,352 A | 5/1936 | Jordan |
| 2,130,196 A | 9/1938 | Sakier |
| 2,192,383 A | 3/1940 | Krolop |
| 2,202,107 A | 5/1940 | Korn |
| 2,281,370 A | 4/1942 | Morrison et al. |
| 2,328,129 A | 8/1943 | Earle |
| 2,438,762 A | 3/1948 | McLeckie |
| 2,470,187 A | 5/1949 | Price |
| 2,479,571 A | 8/1949 | Hewitt |
| 2,498,699 A | 2/1950 | Mullett et al. |
| 2,504,740 A | 4/1950 | Siegel |
| 2,521,769 A | 9/1950 | Arcularius |
| 2,537,821 A | 1/1951 | Fodor |
| 2,591,669 A | 4/1952 | Bucknell et al. |
| 2,606,274 A | 8/1952 | Spierer |
| RE23,674 E | 6/1953 | Spierer et al. |
| 2,641,679 A | 6/1953 | Brodbeck |
| 2,646,629 A | 7/1953 | Clemens |
| 2,651,705 A | 9/1953 | Clemens |
| 2,666,837 A | 1/1954 | Brodbeck |
| 2,677,041 A | 4/1954 | Oliver et al. |
| 2,698,894 A | 1/1955 | Stein |
| 2,714,151 A | 7/1955 | Becker |
| 2,761,222 A | 9/1956 | Bennett |
| 2,767,407 A | 10/1956 | Weiss |
| 2,777,934 A | 1/1957 | Falkenthal |
| 2,826,763 A | 3/1958 | Bass |
| 2,837,835 A | 6/1958 | Hewitt et al. |
| 2,853,591 A | 9/1958 | Fine |
| 2,853,592 A | 9/1958 | Gravet |
| 2,859,535 A | 11/1958 | Carlson |
| 2,906,627 A | 9/1959 | Payton et al. |
| 2,908,019 A | 10/1959 | Lyon, Jr. |
| 2,965,906 A | 12/1960 | Mullett et al. |
| 2,977,455 A | 3/1961 | Murphy |
| 3,059,815 A | 10/1962 | Parsons, Jr. |
| 3,065,473 A | 11/1962 | Sporck et al. |
| 3,076,887 A | 2/1963 | Bulow |
| 3,128,161 A | 4/1964 | Hudon |
| 3,220,424 A | 11/1965 | Nelson |
| 3,305,938 A | 2/1967 | Arthur |
| 3,384,977 A | 5/1968 | Rosenberg |
| 3,409,995 A | 11/1968 | Greenwood et al. |
| 3,415,278 A | 12/1968 | Yamamoto et al. |
| 3,449,838 A | 6/1969 | Chancellor |
| 3,480,787 A | 11/1969 | Johansen |
| 3,487,477 A | 1/1970 | Classen |
| 3,491,381 A | 1/1970 | Catheart |
| 3,502,384 A | 3/1970 | Gipson |
| 3,505,692 A | 4/1970 | Forbes |
| 3,523,305 A | 8/1970 | Zorn |
| 3,536,294 A | 10/1970 | Rodriguez |
| 3,551,919 A | 1/1971 | Forbes |
| 3,556,158 A | 1/1971 | Schneider |
| 3,575,583 A | 4/1971 | Brown |
| 3,575,640 A | 4/1971 | Ishikawa |
| 3,576,277 A | 4/1971 | Blackmon |
| 3,585,652 A | 6/1971 | Forbes et al. |
| 3,585,653 A | 6/1971 | Forbes et al. |
| 3,587,177 A | 6/1971 | Overly et al. |
| 3,588,038 A | 6/1971 | Tanaka |
| 3,603,002 A | 9/1971 | Spierer |
| 3,613,124 A | 10/1971 | Ichimori et al. |
| 3,621,199 A | 11/1971 | Goldstein |
| 3,639,920 A | 2/1972 | Griffin et al. |
| 3,643,346 A | 2/1972 | Lester |
| 3,699,984 A | 10/1972 | Davis |
| 3,724,001 A | 4/1973 | Ichimori et al. |
| 3,744,149 A | 7/1973 | Helbling |
| 3,746,035 A | 7/1973 | Singer |
| 3,757,806 A | 9/1973 | Bhaskar et al. |
| 3,817,651 A | 6/1974 | Law et al. |
| 3,878,621 A | 4/1975 | Duerre |
| 3,904,167 A | 9/1975 | Touch et al. |
| 3,906,795 A | 9/1975 | Kask |
| 3,918,987 A | 11/1975 | Kopfer |
| 3,975,781 A | 8/1976 | Klimboff et al. |
| 3,992,730 A | 11/1976 | Davis |
| 4,072,157 A | 2/1978 | Wines, Jr. et al. |
| 4,086,457 A * | 4/1978 | Niedermeyer .............. 200/84 R |
| 4,120,180 A | 10/1978 | Jedora |
| 4,144,596 A | 3/1979 | MacFarlane et al. |
| 4,145,602 A | 3/1979 | Lee |
| 4,145,769 A | 3/1979 | Macfarlane |
| 4,193,209 A | 3/1980 | Lovison et al. |
| 4,195,416 A | 4/1980 | Hall |
| 4,219,367 A | 8/1980 | Cary, Jr. et al. |
| 4,239,555 A | 12/1980 | Scharlack et al. |
| 4,256,133 A | 3/1981 | Coward et al. |
| 4,295,233 A | 10/1981 | Hinkel et al. |
| 4,309,781 A | 1/1982 | Lissau |
| 4,336,619 A | 6/1982 | Hinkel et al. |
| 4,375,874 A | 3/1983 | Leotta et al. |
| 4,383,377 A | 5/1983 | Crafton |
| 4,398,310 A | 8/1983 | Lienhard |
| 4,402,095 A | 9/1983 | Pepper |
| 4,402,331 A | 9/1983 | Taldo et al. |
| 4,429,422 A | 2/1984 | Wareham |
| 4,453,286 A | 6/1984 | Wieland |
| 4,461,439 A | 7/1984 | Rose |
| 4,497,999 A | 2/1985 | Postbeschild |
| 4,509,543 A | 4/1985 | Livingston et al. |
| 4,520,516 A | 6/1985 | Parsons |
| 4,541,563 A | 9/1985 | Uetsuhara |
| 4,570,823 A * | 2/1986 | Arabian et al. .................. 222/28 |
| 4,594,797 A | 6/1986 | Houck, Jr. |
| 4,598,726 A | 7/1986 | Pepper |
| 4,604,764 A | 8/1986 | Enzo |
| 4,606,085 A | 8/1986 | Davies |
| 4,610,165 A | 9/1986 | Duffy et al. |
| 4,611,768 A | 9/1986 | Voss et al. |
| 4,624,017 A | 11/1986 | Foletta |
| 4,637,254 A | 1/1987 | Dyben et al. |
| 4,642,821 A | 2/1987 | Zanuso et al. |
| 4,642,909 A | 2/1987 | Garcial |
| 4,644,256 A | 2/1987 | Farias et al. |
| 4,651,777 A | 3/1987 | Hardman |
| 4,653,201 A | 3/1987 | Seaman |
| 4,670,010 A | 6/1987 | Dragone |
| 4,671,121 A | 6/1987 | Schieler |
| 4,681,141 A | 7/1987 | Wang |
| 4,682,628 A | 7/1987 | Hill |
| 4,685,222 A | 8/1987 | Houck, Jr. |
| 4,688,277 A | 8/1987 | Kakinoki et al. |
| 4,688,585 A | 8/1987 | Vetter |
| 4,700,049 A | 10/1987 | Rubin |
| 4,702,107 A | 10/1987 | Guerrini et al. |
| 4,707,867 A | 11/1987 | Kawabe et al. |
| 4,707,933 A | 11/1987 | Keck et al. |
| 4,709,728 A | 12/1987 | Ying-Chung |
| 4,716,605 A | 1/1988 | Shepherd et al. |
| 4,722,372 A | 2/1988 | Hoffman et al. |
| 4,735,002 A | 4/1988 | Rath |
| 4,735,357 A | 4/1988 | Gregory et al. |
| 4,741,363 A | 5/1988 | Hu |
| 4,742,583 A | 5/1988 | Yoshida et al. |
| 4,742,836 A | 5/1988 | Buehler |
| 4,744,515 A | 5/1988 | Watanabe |
| 4,746,090 A | 5/1988 | Hamilton |
| 4,762,273 A | 8/1988 | Gregory et al. |
| 4,765,003 A | 8/1988 | Chang |
| 4,767,922 A | 8/1988 | Stauffer |
| 4,769,863 A | 9/1988 | Tegg et al. |
| 4,780,595 A | 10/1988 | Alban |
| 4,785,162 A | 11/1988 | Kuo |
| 4,823,414 A | 4/1989 | Piersimoni et al. |
| 4,826,129 A | 5/1989 | Fong et al. |
| 4,839,039 A | 6/1989 | Parsons et al. |
| 4,848,599 A | 7/1989 | Kano et al. |
| 4,852,802 A | 8/1989 | Iggulden et al. |
| 4,856,122 A | 8/1989 | Pilolla |
| 4,857,112 A | 8/1989 | Franninge |
| 4,857,705 A | 8/1989 | Blevins |
| 4,872,485 A | 10/1989 | Laverty, Jr. |

(56) References Cited

U.S. PATENT DOCUMENTS

| | | |
|---|---|---|
| 4,876,435 A | 10/1989 | Hawkins |
| 4,882,467 A | 11/1989 | Dimick |
| 4,883,749 A | 11/1989 | Roberts et al. |
| 4,889,315 A | 12/1989 | Imanaga |
| 4,894,874 A | 1/1990 | Wilson |
| 4,909,580 A | 3/1990 | Mitchell |
| 4,914,758 A | 4/1990 | Shaw |
| 4,914,833 A | 4/1990 | Pilolla et al. |
| 4,915,347 A | 4/1990 | Iqbal et al. |
| 4,916,382 A | 4/1990 | Kent |
| 4,916,613 A | 4/1990 | Lange et al. |
| 4,921,129 A | 5/1990 | Jones et al. |
| 4,921,131 A | 5/1990 | Binderbauer et al. |
| 4,921,211 A | 5/1990 | Novak et al. |
| 4,940,298 A | 7/1990 | Jackson et al. |
| 4,941,219 A | 7/1990 | Van Marcke |
| 4,942,631 A | 7/1990 | Rosa |
| 4,948,090 A | 8/1990 | Chen |
| 4,953,236 A | 9/1990 | Lee et al. |
| 4,954,179 A | 9/1990 | Franninge |
| 4,955,535 A | 9/1990 | Tsutsui et al. |
| 4,959,603 A | 9/1990 | Yamamoto et al. |
| 4,963,780 A | 10/1990 | Hochstrasser |
| 4,967,425 A | 11/1990 | Kawamura et al. |
| 4,971,106 A | 11/1990 | Tsutsui et al. |
| 4,980,474 A | 12/1990 | Hayashi et al. |
| 4,980,574 A | 12/1990 | Cirrito |
| 4,984,314 A | 1/1991 | Weigert |
| 4,986,221 A | 1/1991 | Shaw |
| 4,989,755 A | 2/1991 | Shiau |
| 4,995,585 A | 2/1991 | Gruber et al. |
| 4,998,673 A | 3/1991 | Pilolla |
| 5,000,044 A | 3/1991 | Duffy et al. |
| 5,008,963 A | 4/1991 | Stein |
| 5,018,550 A | 5/1991 | Burdorff |
| 5,018,885 A * | 5/1991 | Uggetti ......................... 400/196 |
| 5,025,516 A | 6/1991 | Wilson |
| 5,031,258 A | 7/1991 | Shaw |
| 5,031,337 A | 7/1991 | Pilolla et al. |
| 5,033,508 A | 7/1991 | Laverty, Jr. |
| 5,033,715 A | 7/1991 | Chiang et al. |
| 5,060,323 A | 10/1991 | Shaw |
| 5,062,364 A | 11/1991 | Lewis et al. |
| 5,063,622 A | 11/1991 | Tsutsui et al. |
| 5,063,955 A | 11/1991 | Sakakibara |
| 5,072,618 A | 12/1991 | Taylor et al. |
| 5,074,322 A | 12/1991 | Jaw |
| 5,074,520 A | 12/1991 | Lee et al. |
| 5,076,424 A | 12/1991 | Nakamura |
| 5,080,324 A | 1/1992 | Chi |
| RE33,810 E | 2/1992 | Strieter |
| 5,084,984 A | 2/1992 | Duchoud et al. |
| 5,086,526 A | 2/1992 | Van Marcke |
| 5,092,560 A | 3/1992 | Chen |
| 5,095,941 A | 3/1992 | Betz |
| 5,099,587 A | 3/1992 | Jarosch |
| 5,111,594 A | 5/1992 | Allen |
| 5,117,693 A | 6/1992 | Duksa |
| 5,133,095 A | 7/1992 | Shiba et al. |
| 5,144,757 A | 9/1992 | Sasso |
| 5,146,695 A | 9/1992 | Yang |
| 5,158,114 A | 10/1992 | Botsolas |
| 5,163,234 A | 11/1992 | Tsukamoto et al. |
| 5,169,118 A | 12/1992 | Whiteside |
| 5,170,944 A | 12/1992 | Shirai |
| D332,369 S | 1/1993 | Hanna et al. |
| D332,370 S | 1/1993 | Hanna et al. |
| 5,175,892 A | 1/1993 | Shaw |
| 5,177,879 A | 1/1993 | Muta |
| 5,181,328 A | 1/1993 | Bouverie |
| 5,184,642 A | 2/1993 | Powell |
| 5,186,360 A | 2/1993 | Mease et al. |
| 5,193,563 A | 3/1993 | Melech |
| 5,199,116 A | 4/1993 | Fischer |
| 5,199,118 A | 4/1993 | Cole et al. |
| 5,199,188 A | 4/1993 | Franz |
| 5,202,666 A | 4/1993 | Knippscheer |
| 5,216,251 A | 6/1993 | Matschke |
| 5,217,035 A | 6/1993 | Van Marcke |
| 5,224,685 A | 7/1993 | Chiang et al. |
| 5,226,629 A | 7/1993 | Millman et al. |
| 5,230,109 A | 7/1993 | Zaccai et al. |
| 5,239,610 A | 8/1993 | Shao |
| 5,243,717 A | 9/1993 | Yasuo |
| 5,251,872 A | 10/1993 | Kodaira |
| 5,253,376 A | 10/1993 | Fait |
| 5,255,822 A | 10/1993 | Mease et al. |
| 5,257,423 A | 11/1993 | Jacobsen et al. |
| 5,259,410 A | 11/1993 | Trueb et al. |
| 5,265,288 A | 11/1993 | Allison |
| 5,265,628 A | 11/1993 | Sage et al. |
| D342,177 S | 12/1993 | Hanna et al. |
| 5,267,475 A | 12/1993 | Gaston |
| 5,269,071 A | 12/1993 | Hamabe et al. |
| 5,272,918 A | 12/1993 | Gaston et al. |
| 5,280,679 A | 1/1994 | Edelman |
| 5,282,812 A * | 2/1994 | Suarez, Jr. ................... 606/158 |
| 5,341,839 A | 8/1994 | Kobayashi et al. |
| 5,347,864 A | 9/1994 | Senghaas et al. |
| 5,351,347 A | 10/1994 | Kunkel |
| 5,351,417 A | 10/1994 | Rubin |
| 5,362,026 A | 11/1994 | Kobayashi et al. |
| 5,363,517 A | 11/1994 | Botsolas |
| 5,367,442 A | 11/1994 | Frost et al. |
| 5,369,818 A | 12/1994 | Barnum et al. |
| 5,377,424 A | 1/1995 | Albanes |
| 5,377,427 A | 1/1995 | Mashata |
| 5,397,099 A | 3/1995 | Pilolla |
| 5,404,419 A | 4/1995 | Artis, Jr. |
| 5,412,816 A | 5/1995 | Paterson et al. |
| 5,412,818 A | 5/1995 | Chen |
| 5,426,271 A | 6/1995 | Clark et al. |
| 5,438,714 A | 8/1995 | Shaw |
| 5,438,763 A | 8/1995 | Yang |
| 5,442,867 A | 8/1995 | Robinson |
| 5,459,944 A | 10/1995 | Tatsutani et al. |
| 5,477,984 A | 12/1995 | Sayama et al. |
| 5,482,250 A | 1/1996 | Kodaira |
| 5,497,135 A | 3/1996 | Wisskirchen et al. |
| 5,504,950 A | 4/1996 | Natalizia et al. |
| 5,514,346 A | 5/1996 | Fujita |
| 5,522,411 A | 6/1996 | Johnson |
| 5,548,119 A | 8/1996 | Nortier |
| 5,555,912 A | 9/1996 | Saadi et al. |
| 5,561,871 A | 10/1996 | Laughton |
| 5,566,404 A | 10/1996 | Laughton |
| 5,570,869 A | 11/1996 | Diaz et al. |
| 5,586,746 A | 12/1996 | Humpert et al. |
| 5,588,636 A | 12/1996 | Eichholz et al. |
| 5,595,216 A | 1/1997 | Pilolla |
| 5,610,591 A | 3/1997 | Gallagher |
| 5,611,093 A | 3/1997 | Barnum et al. |
| 5,611,517 A | 3/1997 | Saadi et al. |
| 5,625,908 A | 5/1997 | Shaw |
| 5,627,375 A | 5/1997 | Hsieh |
| 5,640,781 A | 6/1997 | Carson |
| 5,642,462 A | 6/1997 | Huff |
| 5,651,189 A | 7/1997 | Coykendall et al. |
| 5,651,384 A | 7/1997 | Rudrich |
| 5,670,945 A | 9/1997 | Applonie |
| 5,694,653 A | 12/1997 | Harald |
| 5,699,833 A | 12/1997 | Tsataros |
| 5,701,929 A | 12/1997 | Helmsderfer |
| 5,727,579 A | 3/1998 | Chardack |
| 5,730,165 A | 3/1998 | Philipp |
| 5,743,511 A | 4/1998 | Eichholz et al. |
| 5,758,688 A | 6/1998 | Hamanaka et al. |
| 5,765,242 A | 6/1998 | Marciano |
| 5,769,120 A | 6/1998 | Laverty, Jr. et al. |
| 5,781,942 A | 7/1998 | Allen et al. |
| 5,782,382 A | 7/1998 | Van Marcke |
| 5,813,047 A | 9/1998 | Teuchroeb |
| 5,819,335 A | 10/1998 | Hennessy |
| 5,819,336 A | 10/1998 | Gilliam et al. |

(56) References Cited

U.S. PATENT DOCUMENTS

| | | |
|---|---|---|
| 5,829,072 A | 11/1998 | Hirsch et al. |
| 5,855,356 A | 1/1999 | Fait |
| 5,868,311 A | 2/1999 | Cretu-Petra |
| 5,873,178 A | 2/1999 | Johnson |
| 5,873,179 A | 2/1999 | Gregory et al. |
| 5,875,562 A | 3/1999 | Fogarty |
| 5,893,387 A | 4/1999 | Paterson et al. |
| 5,915,417 A | 6/1999 | Diaz et al. |
| 5,915,851 A | 6/1999 | Wattrick et al. |
| 5,918,855 A | 7/1999 | Hamanaka et al. |
| 5,924,148 A | 7/1999 | Flowers, Sr. |
| 5,943,712 A | 8/1999 | Van Marcke |
| 5,943,713 A | 8/1999 | Paterson et al. |
| 5,945,068 A | 8/1999 | Ferone |
| 5,945,913 A | 8/1999 | Gallagher |
| 5,950,983 A | 9/1999 | Jahrling |
| 5,954,069 A | 9/1999 | Foster |
| 5,961,095 A | 10/1999 | Schrott |
| 5,966,753 A | 10/1999 | Gauthier et al. |
| 5,972,126 A | 10/1999 | Fernie |
| 5,974,685 A | 11/1999 | Hironaka |
| 5,979,500 A | 11/1999 | Jahrling et al. |
| 5,984,262 A | 11/1999 | Parsons et al. |
| 5,988,588 A | 11/1999 | Allen et al. |
| 5,992,430 A | 11/1999 | Chardack et al. |
| 6,000,429 A | 12/1999 | Van Marcke |
| 6,003,170 A | 12/1999 | Humpert et al. |
| 6,006,388 A | 12/1999 | Young |
| 6,006,784 A | 12/1999 | Tsutsui et al. |
| 6,018,885 A | 2/2000 | Hill |
| 6,029,292 A | 2/2000 | Leiferman et al. |
| 6,029,293 A | 2/2000 | Paterson et al. |
| 6,038,786 A | 3/2000 | Aisenberg et al. |
| 6,056,261 A | 5/2000 | Aparicio et al. |
| 6,059,192 A | 5/2000 | Zosimadis |
| 6,067,673 A | 5/2000 | Paese et al. |
| 6,082,407 A | 7/2000 | Paterson et al. |
| 6,089,086 A | 7/2000 | Swindler et al. |
| 6,110,292 A | 8/2000 | Jewett et al. |
| 6,119,285 A | 9/2000 | Kim |
| 6,125,482 A | 10/2000 | Foster |
| 6,127,671 A | 10/2000 | Parsons et al. |
| 6,128,826 A | 10/2000 | Robinson |
| 6,131,587 A | 10/2000 | Chardack et al. |
| 6,142,342 A | 11/2000 | Lewis |
| 6,161,227 A | 12/2000 | Bargenquast |
| 6,161,814 A | 12/2000 | Jahrling |
| 6,178,572 B1 | 1/2001 | Van Marcke |
| 6,185,838 B1 | 2/2001 | Moore |
| 6,189,163 B1 | 2/2001 | Van Marcke |
| 6,189,230 B1 | 2/2001 | Huen |
| 6,192,530 B1 | 2/2001 | Dai |
| 6,199,428 B1 | 3/2001 | Estevez-Garcia et al. |
| 6,202,980 B1 | 3/2001 | Vincent et al. |
| 6,206,340 B1 | 3/2001 | Paese et al. |
| 6,209,392 B1 | 4/2001 | Rapala |
| 6,212,707 B1 | 4/2001 | Thompson et al. |
| 6,216,534 B1 | 4/2001 | Ross, Jr. et al. |
| 6,219,857 B1 | 4/2001 | Wu |
| 6,219,859 B1 | 4/2001 | Derakhshan |
| 6,236,317 B1 | 5/2001 | Cohen et al. |
| 6,250,601 B1 | 6/2001 | Kolar et al. |
| 6,253,609 B1 | 7/2001 | Ross, Jr. et al. |
| 6,253,611 B1 | 7/2001 | Varga et al. |
| 6,257,264 B1 | 7/2001 | Sturman et al. |
| 6,267,007 B1 | 7/2001 | Gunther |
| 6,269,695 B1 | 8/2001 | Cesternino et al. |
| 6,273,394 B1 | 8/2001 | Vincent et al. |
| 6,279,179 B1 | 8/2001 | Register |
| 6,279,587 B1 | 8/2001 | Yamamoto |
| 6,282,812 B1 | 9/2001 | Wee et al. |
| 6,286,153 B1 | 9/2001 | Keller |
| 6,289,728 B1 | 9/2001 | Wilkins |
| 6,294,786 B1 | 9/2001 | Marcichow et al. |
| 6,295,410 B1 | 9/2001 | Helms et al. |
| 6,298,502 B1 | 10/2001 | Brown |
| 6,317,717 B1 | 11/2001 | Lindsey et al. |
| 6,321,785 B1 | 11/2001 | Bergmann |
| 6,322,005 B1 | 11/2001 | Kern et al. |
| 6,340,032 B1 | 1/2002 | Zosimadis |
| 6,341,389 B2 | 1/2002 | Philipps-Liebich et al. |
| 6,349,484 B1 | 2/2002 | Cohen |
| 6,351,866 B1 | 3/2002 | Bragulla |
| 6,363,549 B2 | 4/2002 | Humpert et al. |
| 6,370,951 B1 | 4/2002 | Kerchaert et al. |
| 6,386,390 B1 | 5/2002 | Tinker |
| 6,390,125 B2 | 5/2002 | Pawelzik et al. |
| 6,393,634 B1 | 5/2002 | Kodaira et al. |
| 6,401,274 B1 | 6/2002 | Brown |
| 6,408,881 B2 | 6/2002 | Lorenzelli et al. |
| 6,418,788 B2 | 7/2002 | Articolo |
| 6,426,701 B1 | 7/2002 | Levy et al. |
| 6,431,189 B1 | 8/2002 | Deibert |
| RE37,888 E | 10/2002 | Cretu-Petra |
| 6,467,514 B1 | 10/2002 | Korst et al. |
| 6,467,651 B1 | 10/2002 | Muderlak et al. |
| 6,481,040 B1 | 11/2002 | McIntyre |
| 6,481,634 B1 | 11/2002 | Zosimadis |
| 6,484,965 B1 | 11/2002 | Reaves |
| 6,508,121 B2 | 1/2003 | Eck |
| 6,523,193 B2 | 2/2003 | Saraya |
| 6,523,404 B1 | 2/2003 | Murphy et al. |
| 6,568,655 B2 | 5/2003 | Paese et al. |
| 6,572,207 B2 | 6/2003 | Hase et al. |
| 6,598,245 B2 | 7/2003 | Nishioka |
| 6,619,320 B2 | 9/2003 | Parsons |
| 6,624,606 B2 | 9/2003 | Kushida et al. |
| 6,639,209 B1 | 10/2003 | Patterson et al. |
| 6,641,002 B2 | 11/2003 | Gerenraich et al. |
| 6,643,865 B2 | 11/2003 | Bork et al. |
| 6,651,851 B2 | 11/2003 | Muderlak et al. |
| 6,658,934 B1 | 12/2003 | Housey et al. |
| 6,671,890 B2 | 1/2004 | Nishioka |
| 6,671,898 B1 | 1/2004 | Eggenberger et al. |
| 6,679,285 B2 | 1/2004 | Pablo |
| 6,691,340 B2 | 2/2004 | Honda et al. |
| 6,691,724 B2 | 2/2004 | Ford |
| 6,711,949 B1 | 3/2004 | Sorenson |
| 6,711,950 B2 | 3/2004 | Yamaura et al. |
| 6,715,730 B2 | 4/2004 | Ehr |
| 6,766,589 B1 | 7/2004 | Bory et al. |
| 6,769,197 B1 | 8/2004 | Tai |
| 6,769,443 B2 | 8/2004 | Bush |
| 6,770,869 B2 | 8/2004 | Patterson et al. |
| 6,789,197 B1 | 9/2004 | Saito |
| 6,812,657 B2 | 11/2004 | Raimondi |
| 6,827,294 B1 | 12/2004 | Fan et al. |
| 6,843,079 B2 | 1/2005 | Hird |
| 6,857,314 B2 | 2/2005 | Ohhashi et al. |
| 6,871,541 B2 | 3/2005 | Weisse |
| 6,882,278 B2 | 4/2005 | Winings et al. |
| 6,883,563 B2 | 4/2005 | Smith |
| 6,912,864 B2 | 7/2005 | Roche et al. |
| 6,915,690 B2 | 7/2005 | Okada et al. |
| 6,922,144 B2 | 7/2005 | Bulin et al. |
| 6,922,912 B2 | 8/2005 | Phillips |
| 6,928,235 B2 | 8/2005 | Pollack |
| 6,929,150 B2 | 8/2005 | Muderlak et al. |
| 6,950,606 B2 | 9/2005 | Logan et al. |
| 6,962,005 B1 | 11/2005 | Khosropour et al. |
| 6,962,168 B2 | 11/2005 | McDaniel et al. |
| 6,964,405 B2 | 11/2005 | Marcichow et al. |
| 6,966,334 B2 | 11/2005 | Bolster |
| 6,968,860 B1 | 11/2005 | Haenlein et al. |
| D512,648 S | 12/2005 | Smith et al. |
| 6,980,126 B2 | 12/2005 | Fournier |
| 6,986,171 B1 | 1/2006 | Perrin |
| 6,993,968 B2 | 2/2006 | Kogure |
| 6,996,863 B2 | 2/2006 | Kaneko |
| 7,007,318 B1 | 3/2006 | Bork et al. |
| 7,014,166 B1 | 3/2006 | Wang |
| 7,018,473 B2 | 3/2006 | Shadrach, III |
| 7,025,227 B2 | 4/2006 | Oliver et al. |
| 7,039,301 B1 | 5/2006 | Aisenberg et al. |

(56) References Cited

U.S. PATENT DOCUMENTS

| | | | |
|---|---|---|---|
| 7,039,963 B2 | 5/2006 | Loberger et al. |
| 7,079,037 B2 | 7/2006 | Ross, Jr. et al. |
| 7,082,828 B1 | 8/2006 | Wilkins |
| 7,093,485 B2 | 8/2006 | Newman et al. |
| 7,104,519 B2 | 9/2006 | O'Maley et al. |
| 7,107,631 B2 | 9/2006 | Lang et al. |
| 7,114,510 B2 | 10/2006 | Peters et al. |
| 7,150,293 B2 | 12/2006 | Jonte |
| 7,165,450 B2 | 1/2007 | Jamnia et al. |
| 7,174,577 B2 | 2/2007 | Jost et al. |
| 7,191,484 B2 | 3/2007 | Dawe |
| 7,191,920 B2 | 3/2007 | Boll et al. |
| 7,198,175 B2 | 4/2007 | Ophardt |
| 7,201,052 B2 | 4/2007 | Lee |
| 7,219,686 B2 | 5/2007 | Schmitz et al. |
| 7,228,874 B2 | 6/2007 | Bolderheij et al. |
| 7,228,984 B2 | 6/2007 | Tack et al. |
| 7,232,111 B2 | 6/2007 | McDaniel et al. |
| 7,242,307 B1 | 7/2007 | LeBlond et al. |
| 7,271,728 B2 | 9/2007 | Taylor et al. |
| 7,278,624 B2 | 10/2007 | Iott et al. |
| 7,296,765 B2 | 11/2007 | Rodrian |
| 7,305,722 B2 | 12/2007 | Sha et al. |
| 7,315,165 B2 | 1/2008 | Kleinen et al. |
| 7,318,949 B2 | 1/2008 | Shadrach, III |
| 7,320,146 B2 | 1/2008 | Nortier et al. |
| 7,343,799 B2 | 3/2008 | Nagakura et al. |
| 7,350,245 B2 | 4/2008 | Giagni |
| 7,350,413 B2 | 4/2008 | Nagakura et al. |
| 7,364,053 B2 | 4/2008 | Ophardt |
| 7,377,163 B2 | 5/2008 | Miyagawa |
| 7,396,000 B2 | 7/2008 | Parsons et al. |
| 7,406,722 B2 | 8/2008 | Fukuizumi et al. |
| 7,409,860 B2 | 8/2008 | Ferreira et al. |
| 7,437,833 B2 | 10/2008 | Sato et al. |
| 7,443,305 B2 | 10/2008 | Verdiramo |
| 7,451,894 B2 | 11/2008 | Ophardt |
| 7,455,197 B2 | 11/2008 | Ophardt |
| 7,458,261 B2 | 12/2008 | Miyagawa |
| 7,464,418 B2 | 12/2008 | Seggio et al. |
| 7,467,550 B2 | 12/2008 | Betz, II et al. |
| 7,471,883 B2 | 12/2008 | Seutter et al. |
| 7,472,433 B2 | 1/2009 | Rodenbeck et al. |
| 7,477,148 B2 | 1/2009 | Lynn et al. |
| 7,484,409 B2 | 2/2009 | Dykstra et al. |
| 7,516,939 B2 | 4/2009 | Bailey |
| 7,527,174 B2 | 5/2009 | Meehan et al. |
| 7,530,269 B2 | 5/2009 | Newman et al. |
| 7,533,787 B2 | 5/2009 | Muderlak et al. |
| 7,537,195 B2 | 5/2009 | McDaniel et al. |
| 7,555,209 B2 | 6/2009 | Pradas Diez et al. |
| 7,588,168 B2 | 9/2009 | Bagwell et al. |
| 7,596,883 B2 | 10/2009 | Kameishi |
| 7,597,122 B1 | 10/2009 | Smith |
| 7,607,442 B2 | 10/2009 | Barnhill et al. |
| 7,607,443 B2 | 10/2009 | Barnhill et al. |
| 7,614,096 B2 | 11/2009 | Vincent |
| 7,614,160 B2 | 11/2009 | Kameishi et al. |
| 7,617,830 B2 | 11/2009 | Barnhill et al. |
| 7,627,909 B2 | 12/2009 | Esche |
| 7,631,372 B2 | 12/2009 | Marty et al. |
| 7,641,173 B2 | 1/2010 | Goodman |
| 7,641,740 B2 | 1/2010 | Barnhill et al. |
| 7,650,653 B2 | 1/2010 | Johnson et al. |
| 7,651,068 B2 | 1/2010 | Bailey |
| 7,657,162 B2 | 2/2010 | Itoigawa et al. |
| 7,659,824 B2 | 2/2010 | Prodanovich et al. |
| 7,681,447 B2 | 3/2010 | Nagakura et al. |
| 7,682,464 B2 | 3/2010 | Glenn et al. |
| 7,690,395 B2 | 4/2010 | Jonte et al. |
| 7,690,623 B2 | 4/2010 | Parsons et al. |
| 7,698,770 B2 | 4/2010 | Barnhill et al. |
| 7,701,164 B2 | 4/2010 | Clothier et al. |
| 7,721,602 B2 | 5/2010 | Benner et al. |
| 7,726,334 B2 | 6/2010 | Ross, Jr. et al. |
| 7,731,154 B2 | 6/2010 | Parsons et al. |
| 7,743,438 B2 | 6/2010 | Chen |
| 7,743,782 B2 | 6/2010 | Jost |
| 7,750,594 B2 | 7/2010 | Clothier et al. |
| 7,754,021 B2 | 7/2010 | Barnhill et al. |
| 7,754,022 B2 | 7/2010 | Barnhill et al. |
| 7,757,700 B2 | 7/2010 | Barnhill et al. |
| 7,758,701 B2 | 7/2010 | Barnhill et al. |
| 7,766,026 B2 | 8/2010 | Boey |
| 7,766,194 B2 | 8/2010 | Boll et al. |
| 7,774,953 B1 | 8/2010 | Duran |
| 7,784,481 B2 | 8/2010 | Kunkel |
| 7,786,628 B2 | 8/2010 | Childe et al. |
| 7,789,095 B2 | 9/2010 | Barnhill et al. |
| 7,797,769 B2 | 9/2010 | Ozenick |
| 7,804,409 B2 | 9/2010 | Munro et al. |
| 7,812,598 B2 | 10/2010 | Yasuda et al. |
| 7,814,582 B2 | 10/2010 | Reddy et al. |
| 7,815,134 B2 | 10/2010 | Hohl |
| 7,818,083 B2 | 10/2010 | Glenn et al. |
| 7,819,136 B1 | 10/2010 | Eddy |
| 7,825,564 B2 | 11/2010 | Croft et al. |
| RE42,005 E | 12/2010 | Jost et al. |
| 7,856,736 B2 | 12/2010 | Churchill et al. |
| 7,860,671 B1 | 12/2010 | LaCaze |
| 7,944,116 B2 | 5/2011 | Causier |
| 7,946,055 B2 | 5/2011 | Churchill et al. |
| 7,971,368 B2 | 7/2011 | Fukaya et al. |
| 8,037,619 B2 | 10/2011 | Liu |
| 8,064,756 B2 | 11/2011 | Liu |
| 8,128,465 B2 | 3/2012 | Collins |
| 8,155,508 B2 | 4/2012 | Caine et al. |
| 8,201,344 B2 | 6/2012 | Sawabe et al. |
| 2001/0011389 A1 | 8/2001 | Philipps-Liebich et al. |
| 2001/0011390 A1 | 8/2001 | Humpert et al. |
| 2001/0020619 A1 | 9/2001 | Pfeifer et al. |
| 2002/0006275 A1 | 1/2002 | Pollack |
| 2002/0019709 A1 | 2/2002 | Segal |
| 2002/0104159 A1 | 8/2002 | Nishioka |
| 2002/0157176 A1 | 10/2002 | Wawrla et al. |
| 2002/0171056 A1 | 11/2002 | Paese et al. |
| 2003/0037612 A1 | 2/2003 | Nagakura et al. |
| 2003/0172547 A1 | 9/2003 | Shepard |
| 2003/0188380 A1 | 10/2003 | Loberger et al. |
| 2003/0210140 A1 | 11/2003 | Menard et al. |
| 2003/0213062 A1 | 11/2003 | Honda et al. |
| 2004/0016296 A1 | 1/2004 | Weisse |
| 2004/0025248 A1 | 2/2004 | Lang et al. |
| 2004/0083547 A1 | 5/2004 | Mercier |
| 2004/0128755 A1 | 7/2004 | Loberger et al. |
| 2004/0129075 A1 | 7/2004 | Sorenson |
| 2004/0143898 A1 | 7/2004 | Jost et al. |
| 2004/0149779 A1 | 8/2004 | Boll et al. |
| 2004/0182151 A1 | 9/2004 | Meure |
| 2004/0221645 A1 | 11/2004 | Brzozowski et al. |
| 2004/0221646 A1 | 11/2004 | Ohhashi et al. |
| 2004/0221647 A1 | 11/2004 | Sabatino |
| 2004/0238660 A1 | 12/2004 | Fan et al. |
| 2005/0000015 A1 | 1/2005 | Kaneko |
| 2005/0087557 A1 | 4/2005 | Oliver et al. |
| 2005/0098968 A1 | 5/2005 | Dyson et al. |
| 2005/0199843 A1 | 9/2005 | Jost et al. |
| 2005/0205818 A1 | 9/2005 | Bayley et al. |
| 2006/0098961 A1 | 5/2006 | Seutter et al. |
| 2006/0101575 A1 | 5/2006 | Louis |
| 2006/0102642 A1 | 5/2006 | Muntzing et al. |
| 2006/0150316 A1 | 7/2006 | Fukuizumi et al. |
| 2006/0151513 A1 | 7/2006 | Shadrach, III |
| 2006/0185074 A1 | 8/2006 | Loberger et al. |
| 2006/0200903 A1 | 9/2006 | Rodenbeck et al. |
| 2006/0207019 A1 | 9/2006 | Vincent |
| 2006/0225200 A1 | 10/2006 | Wierenga |
| 2007/0023565 A1 | 2/2007 | Babikian |
| 2007/0079524 A1 | 4/2007 | Sato et al. |
| 2007/0094787 A1 | 5/2007 | Hwang |
| 2007/0144034 A1 | 6/2007 | Kameishi |
| 2007/0151338 A1 | 7/2007 | Benner et al. |
| 2007/0194637 A1 | 8/2007 | Childe et al. |
| 2007/0230839 A1 | 10/2007 | Childe et al. |

(56) References Cited

U.S. PATENT DOCUMENTS

| | | |
|---|---|---|
| 2007/0252551 A1 | 11/2007 | Clothier et al. |
| 2007/0261162 A1 | 11/2007 | Atkinson |
| 2007/0263994 A1 | 11/2007 | Diez et al. |
| 2007/0278983 A1 | 12/2007 | Clothier et al. |
| 2008/0005833 A1 | 1/2008 | Bayley et al. |
| 2008/0018995 A1 | 1/2008 | Baun |
| 2008/0072668 A1 | 3/2008 | Miyagawa |
| 2008/0078019 A1 | 4/2008 | Allen, Jr. et al. |
| 2008/0083786 A1 | 4/2008 | Marin |
| 2008/0098950 A1 | 5/2008 | Gudjohnsen et al. |
| 2008/0099088 A1 | 5/2008 | Boey |
| 2008/0109956 A1 | 5/2008 | Bayley et al. |
| 2008/0127410 A1 | 6/2008 | Schmitt et al. |
| 2008/0185396 A1 | 8/2008 | Yang et al. |
| 2008/0185398 A1 | 8/2008 | Yang et al. |
| 2008/0185399 A1 | 8/2008 | Yang et al. |
| 2008/0189850 A1 | 8/2008 | Seggio et al. |
| 2008/0193111 A1 | 8/2008 | Seutter et al. |
| 2008/0209760 A1 | 9/2008 | French et al. |
| 2008/0213644 A1 | 9/2008 | Shindoh et al. |
| 2008/0216343 A1 | 9/2008 | Churchill et al. |
| 2008/0216344 A1 | 9/2008 | Churchill et al. |
| 2008/0222910 A1 | 9/2008 | Churchill et al. |
| 2008/0253754 A1 | 10/2008 | Rubin |
| 2008/0256825 A1 | 10/2008 | Hsu |
| 2008/0271527 A1 | 11/2008 | Hewitt |
| 2008/0285134 A1 | 11/2008 | Closset et al. |
| 2008/0289098 A1 | 11/2008 | Kunkel |
| 2008/0301970 A1 | 12/2008 | Hackwell et al. |
| 2008/0313918 A1 | 12/2008 | Dyson et al. |
| 2008/0313919 A1 | 12/2008 | Churchill et al. |
| 2008/0317448 A1 | 12/2008 | Brown et al. |
| 2009/0000023 A1 | 1/2009 | Wegelin et al. |
| 2009/0000024 A1 | 1/2009 | Louis et al. |
| 2009/0000142 A1 | 1/2009 | Churchill et al. |
| 2009/0000147 A1 | 1/2009 | Collins |
| 2009/0031493 A1 | 2/2009 | Tsujita et al. |
| 2009/0034946 A1 | 2/2009 | Caine et al. |
| 2009/0049599 A1 | 2/2009 | Parsons et al. |
| 2009/0056011 A1 | 3/2009 | Wolf et al. |
| 2009/0058666 A1 | 3/2009 | Clabaugh |
| 2009/0069870 A1 | 3/2009 | Haase et al. |
| 2009/0077736 A1 | 3/2009 | Loberger et al. |
| 2009/0094740 A1 | 4/2009 | Ji |
| 2009/0100593 A1 | 4/2009 | Lincoln et al. |
| 2009/0113746 A1 | 5/2009 | Churchill et al. |
| 2009/0113748 A1 | 5/2009 | Dyson et al. |
| 2009/0119832 A1 | 5/2009 | Conroy |
| 2009/0119942 A1 | 5/2009 | Aisenberg et al. |
| 2009/0126103 A1 | 5/2009 | Dietrich et al. |
| 2009/0159612 A1 | 6/2009 | Beavis et al. |
| 2009/0236358 A1 | 9/2009 | Rippl et al. |
| 2009/0243243 A1 | 10/2009 | Watson |
| 2009/0266157 A1 | 10/2009 | Maruo et al. |
| 2009/0293190 A1 | 12/2009 | Ringelstetter et al. |
| 2009/0293192 A1 | 12/2009 | Pons |
| 2010/0014844 A1 | 1/2010 | Dannenberg et al. |
| 2010/0132112 A1 | 6/2010 | Bayley et al. |
| 2010/0139394 A1 | 6/2010 | Pauer et al. |
| 2010/0154239 A1 | 6/2010 | Hutchinson |
| 2010/0168926 A1 | 7/2010 | Bayley et al. |
| 2010/0192399 A1 | 8/2010 | Sawabe et al. |
| 2010/0199759 A1 | 8/2010 | Prasad |
| 2010/0213208 A1 | 8/2010 | Bem et al. |
| 2010/0219013 A1 | 9/2010 | Liddell |
| 2010/0223993 A1 | 9/2010 | Shimizu et al. |
| 2010/0231392 A1 | 9/2010 | Sherron |
| 2010/0236092 A1 | 9/2010 | Causier |
| 2010/0269364 A1 | 10/2010 | Liu |
| 2010/0276529 A1 | 11/2010 | Nguyen |
| 2010/0296799 A1 | 11/2010 | Liu |
| 2011/0006083 A1 | 1/2011 | Walters et al. |
| 2011/0023319 A1 | 2/2011 | Fukaya et al. |
| 2011/0171083 A1 | 7/2011 | Swistak |
| 2012/0011739 A1 | 1/2012 | Nakamura |
| 2012/0017459 A1 | 1/2012 | Kikuchi et al. |
| 2012/0017460 A1 | 1/2012 | Kikuchi et al. |
| 2012/0068849 A1* | 3/2012 | Ross, Jr. .................. 340/618 |

FOREIGN PATENT DOCUMENTS

| | | |
|---|---|---|
| AU | 2006274715 | 2/2007 |
| DE | 19608157 | 7/1997 |
| DE | 102009003070 A1 | 11/2010 |
| EP | 0274785 | 7/1988 |
| EP | 1057942 | 12/2000 |
| EP | 1250878 | 10/2002 |
| EP | 1258568 | 11/2002 |
| EP | 1057441 | 9/2006 |
| EP | 1912549 | 3/2010 |
| EP | 2177142 | 4/2010 |
| EP | 2277424 | 1/2011 |
| JP | 1256632 | 10/1989 |
| JP | 9242155 | 9/1997 |
| JP | 2000-300461 | 10/2000 |
| JP | 2000282528 | 10/2000 |
| JP | 2010046238 | 3/2010 |
| JP | 2010110450 | 5/2010 |
| JP | 2011055859 | 3/2011 |
| WO | WO 01/16436 | 3/2001 |
| WO | WO 2006/055681 | 5/2006 |
| WO | WO 2007/011747 | 1/2007 |
| WO | WO 2007/015046 | 2/2007 |
| WO | WO 2009/039290 | 3/2009 |
| WO | WO 2009/062546 | 5/2009 |
| WO | WO 2010/089927 | 8/2010 |
| WO | WO 2010/095250 | 8/2010 |
| WO | WO 2010/095251 | 8/2010 |
| WO | WO 2010/119536 | 10/2010 |
| WO | WO 2011/009156 | 1/2011 |
| WO | WO2011044247 | 4/2011 |
| WO | WO 2011/077625 | 6/2011 |

OTHER PUBLICATIONS

International Search Report Mailed Nov. 30, 2010 for PCT/US2010051647.
U.S. Appl. No. 29/306,946, filed Oct. 2, 2008, Thielke et al.
International Search Report and Written Opinion for International Application No. PCT/US2004/07675; date of mailing Aug. 6, 2004—(7 pages).
International Search Report and Written Opinion for International Application No. PCT/US2005/002194: date of mailing May 12, 2005—(9 pages).
International Search Report and Written Opinion for International Application No. PCT/US2010/051647; date of mailing Nov. 30, 2010—(11 pages).
Extended European Search Report Dated Jul. 30, 2014: Application No./Patent No. 12773875.5-1554 / 2699878 PCT/US2012032098—(7) Pages.
http://www.syp.mtu.edu/docs/Lesson_Plans/Seven%20Layer%20Density%20Column.pdf, Apr. 16, 2015.
http://www.education.com/activity/article/Layered_Liquids/, Dec. 1, 2014.

* cited by examiner

SOAP DISPENSER HAVING FLUID LEVEL SENSOR

BACKGROUND OF THE INVENTION

The present invention relates generally to soap dispensers and, more particularly, to a liquid soap dispenser having a fluid level sensor.

Soap dispensers commonly used with commercial lavatory systems generally consist of a vessel or container for holding a volume or supply of liquid soap, a nozzle, and a tube connecting the nozzle to the vessel. The nozzle will typically be mounted to a wall or backsplash adjacent a wash basin, a countertop supporting the wash basin, or the wash basin itself. The vessel that holds the supply of liquid soap is typically a refillable container and is commonly mounted to the underside of the wash basin or below a countertop, such as in cabinetry supporting the countertop. A given vessel can be used to supply liquid soap to a single nozzle or to multiple nozzles. Liquid soap dispensers are commonly found in high traffic washrooms like those of shopping malls and centers, schools and universities, airports and bus/rail depots, concert and sport arenas, stadiums, movie theaters and playhouses, parks, and restaurants.

Maintenance personnel are typically charged with periodically inspecting the liquid soap supply to ensure that the level of liquid soap is sufficient to meet the expected short-term demand. This typically requires maintenance personnel to either remove the liquid soap supply container from its position underneath the wash basin, kneel down to a potentially discomforting physical position that allows the fill level of the container to be seen, or remove a spout that allows for a bird's eye view of the inside of the supply container. Whether kneeling down to visually inspect the fill level or taking a bird's eye view, it can be difficult for the person to accurately determine the fill level.

Given these and other difficulties in determining the amount of liquid soap remaining in a given container, it is not uncommon for maintenance personnel to either ignore their responsibility altogether until notified by a visitor that liquid soap is unavailable at one or more of the wash basins or "top off" the liquid soap supply with each check of the fill level. While the latter is certainly preferred over the former from a customer service level, constantly topping off the soap container with replenishing soap adds to the man-hours required to service a washroom.

Another drawback of conventional liquid soap containers is that the placement of the container(s) is often adjacent the wall to which the wash basin is mounted. This placement typically results in the liquid soap container being mounted roughly three feet away from the outer edge of the wash basin or countertop, which can make it very difficult for a service person to visually determine how much liquid soap remains in the container. Moreover, during refilling, it is not uncommon for an excess volume of liquid soap to be poured into the container resulting in an overflow condition that can be messy, wasteful, and costly. It can also lead to the corrosion of parts and increase bacteria collection.

Accordingly, fill level sensors have been developed to measure the level of soap in a container and provide feedback to service personnel without requiring the serviceperson to visually inspect the liquid soap supply. Most of these sensors use costly optics, infrared devices, reed switches, or magnet arrangements to measure the fill level. Since a facility can have several, if not dozens, of wash basins, soap dispensers, and liquid soap supply containers, the added cost of the fill level sensors can be quite impactful and, in some instances, cost prohibitive.

One proposed solution, as described in U.S. Pat. No. 4,610,165, is to use an inclinometer mounted to a float-bearing member that changes elevations in response to volume changes within a liquid soap container. Inclinometers have commonly been used to measure the tilt of a member in relation to gravity. Moreover, conventional inclinometers are advantageously insensitive to movements other than tilt and therefore are generally considered accurate in determining tilt. Additionally, since the output of an inclinometer as a function of tilt angle is typically linear, inclinometers are considered to provide a high resolution output. However, the accuracy and precision of inclinometers often make such devices costly. When incorporated into a liquid soap dispenser, this cost is magnified for facilities, such as malls, schools and universities, stadiums and arenas, offices, and the like that have several, if not dozens, of soap dispensers.

SUMMARY OF THE INVENTION

The present invention provides a fill level sensor for a liquid soap supply container that is believed to have a low materials and assembly cost without a substantial or significant loss of fill level sensitivity. The fill level sensor can be manufactured as part of the liquid soap supply container or added as an after-market add-on.

According to one aspect of the invention, an apparatus includes a vessel for holding a volume of soap and a soap level sensor assembly configured to provide feedback regarding a level of soap in the vessel. The soap level sensor assembly includes an arm operably associated with the vessel such that the position of the arm changes with changes in the volume of soap within the vessel. The sensory assembly further has an accelerometer that outputs a signal that varies in response to changes in the volume of soap within the vessel.

In accordance with another aspect of the invention, a lavatory system includes a basin, a water tap, and a vessel for holding a volume of liquid soap. The vessel has a nozzle for dispensing soap from the vessel, a float in the vessel that changes position in response to changes in volume of liquid soap in the vessel, and an accelerometer that measures the position of the float within the vessel.

In accordance with another aspect of the invention, a fluid level sensor includes a linkage having a first end and a second end. A float is attached to the second end of the linkage. An accelerometer is attached to a surface of the linkage and is operable to move with movement of the float. The sensor is operative to measure changes along a sensing axis relative to a fixed external force vector acting on the float as the float moves in response to changes in fluid level.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

DETAILED DESCRIPTION

Figure 1:
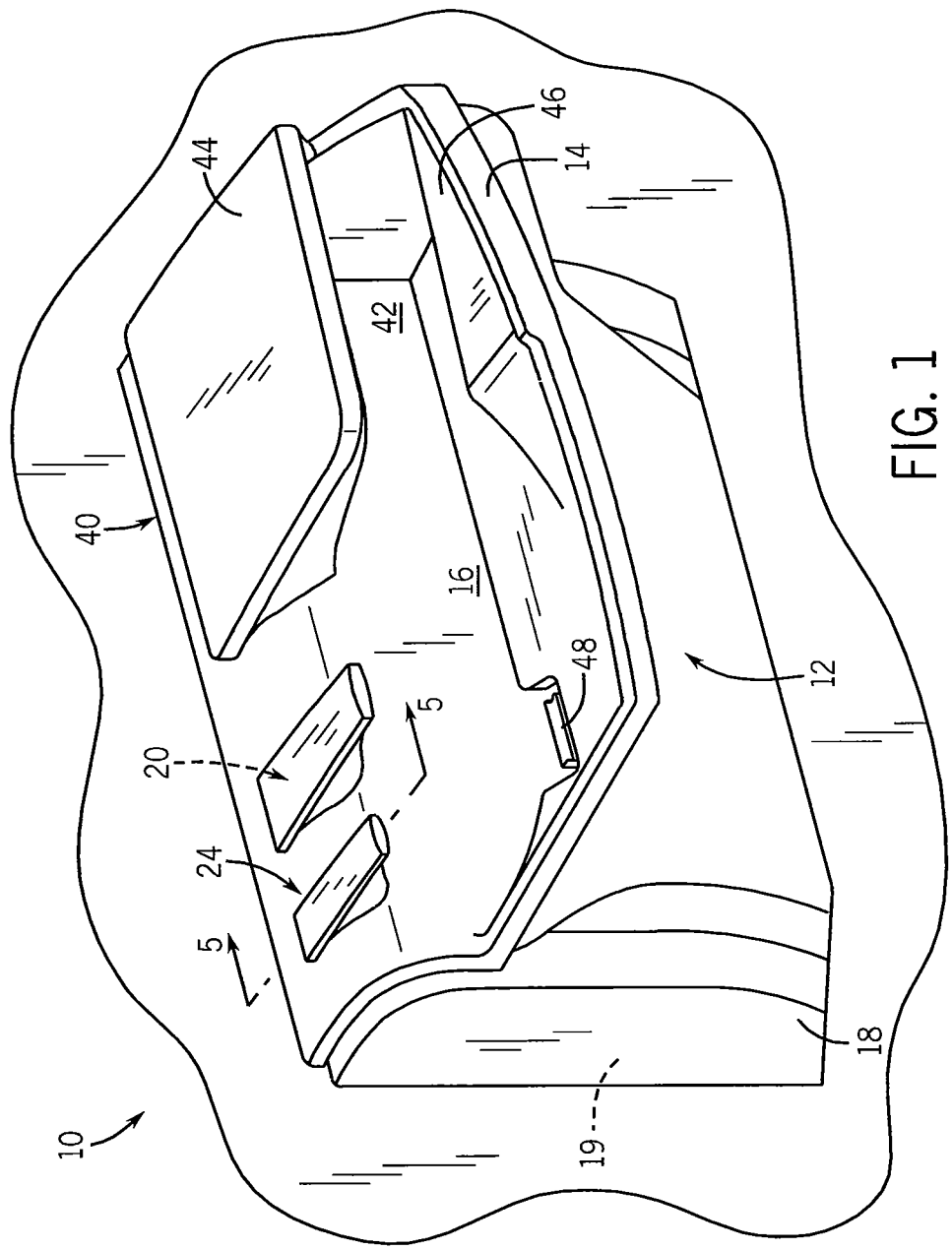
FIG. 1 is an isometric view of a lavatory system having a liquid soap vessel with a fill level sensor according to one aspect of the invention.

Turning now to the Figures and more particularly to FIG. 1, a lavatory system 10 includes a wash basin or sink 12 conventionally attached to a wall (not shown). Alternately, the wash basin 12 could be supported by a pedestal or countertop. The wash basin 12, which can be formed of known materials, such as ceramic, porcelain, stainless steel or other alloy, plastic, fiberglass, or other composite, generally consists of an upper portion 14 in the shape of a bowl, which defines a scrub area 16, and a lower portion 18 defining an enclosure 19 for housing mechanicals, as will be described.

The lavatory system 10 also includes a water tap or faucet 20 for supplying hot and cold water to the scrub area 16. In the illustrated embodiment, a single water tap 20 is shown but it is understood that separate hot and cold water taps could be used. The water tap 20 extends through an opening 22 (FIG. 3) formed in the upper portion 14 of the wash basin 12 and is plumbed to a water supply (not shown) in a conventional manner.

Figure 2:
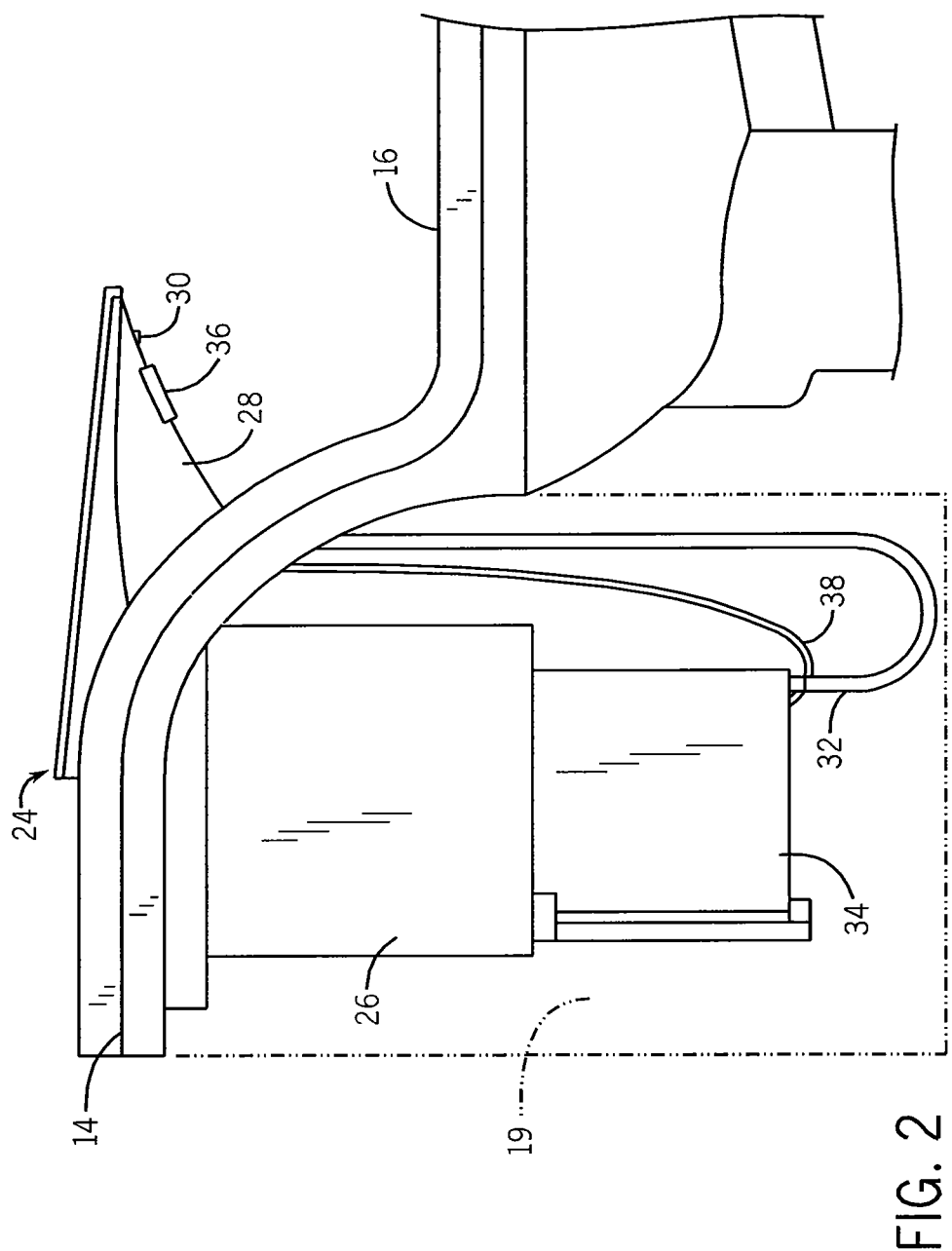
FIG. 2 is a left side elevation view of the lavatory system of FIG. 1 with a portion of the lavatory system removed to expose mechanicals of the lavatory system.

The lavatory system 10 also has a soap dispensing assembly 24 for providing soap to the scrub area 16. The soap dispensing assembly 24 will be described as dispensing liquid soap, but it is understood that the invention could be incorporated with a dispenser capable of dispensing foamed soap, hand sanitizer, shampoo, or other fluids. With additional reference to FIG. 2, the soap dispensing assembly 24 includes a liquid soap container or vessel 26, a spout 28 mounted to the upper portion 14 of the wash basin 12, and a nozzle 30 formed in the spout 28 through which liquid soap can be dispensed. Liquid soap is moved from the vessel 26 to the nozzle 30 through tubing 32. As known in the art, a pump 34 is used to move the liquid soap from the vessel 26 along the tubing 32 to the nozzle 30. In a known manner, a proximity sensor 36, such as an infrared sensor, is mounted to the lower surface of the spout 28 generally adjacent the nozzle 30 and detects the presence of a user's hands beneath the nozzle 30. Responsive thereto, a control signal is provided to the pump 34 along transmission line 38. In a known manner, the detection of a user's hand(s) beneath the nozzle 30 causes activation of the pump 34 to move liquid soap from the vessel 26 to the nozzle 30. It is understood that various control methods may be used to control how much and for how long the pump 34 moves liquid soap to the nozzle 30.

Referring briefly back to FIG. 1, the lavatory system 10 further includes a hand dryer assembly 40 operable to provide several high speed airstreams to a drying chamber 42 defined adjacent the scrub area 16 and between an upper blade 44 and a lower blade 46. In a preferred embodiment, the upper and lower blades 44, 46 each have air nozzles for passing high speed airstreams into the drying chamber. Proximity sensors, such as one or more infrared sensors (not shown) are used to detect a user's hands in the drying chamber. Upon such detection, the hand drying assembly 40 is activated such that a fan (not shown) is charged to move air through the nozzles of the upper and lower blades 44, 46. In a preferred embodiment, the placement of the drying chamber 42 is adjacent the scrub area 16 which allows a user to move his hands from the scrub area 16 to the drying chamber 42 without moving his hands outside the footprint of the wash basin 12. In this regard, water that may otherwise drip onto the floor or the countertop drips onto the wash basin 12, which is sloped to provide water runoff from the drying chamber to the scrub area. A drain 48 is formed in the wash basin 12 beneath the nozzle or water faucet 30 to drain water, soap, dirt, and the like.

Figure 3:
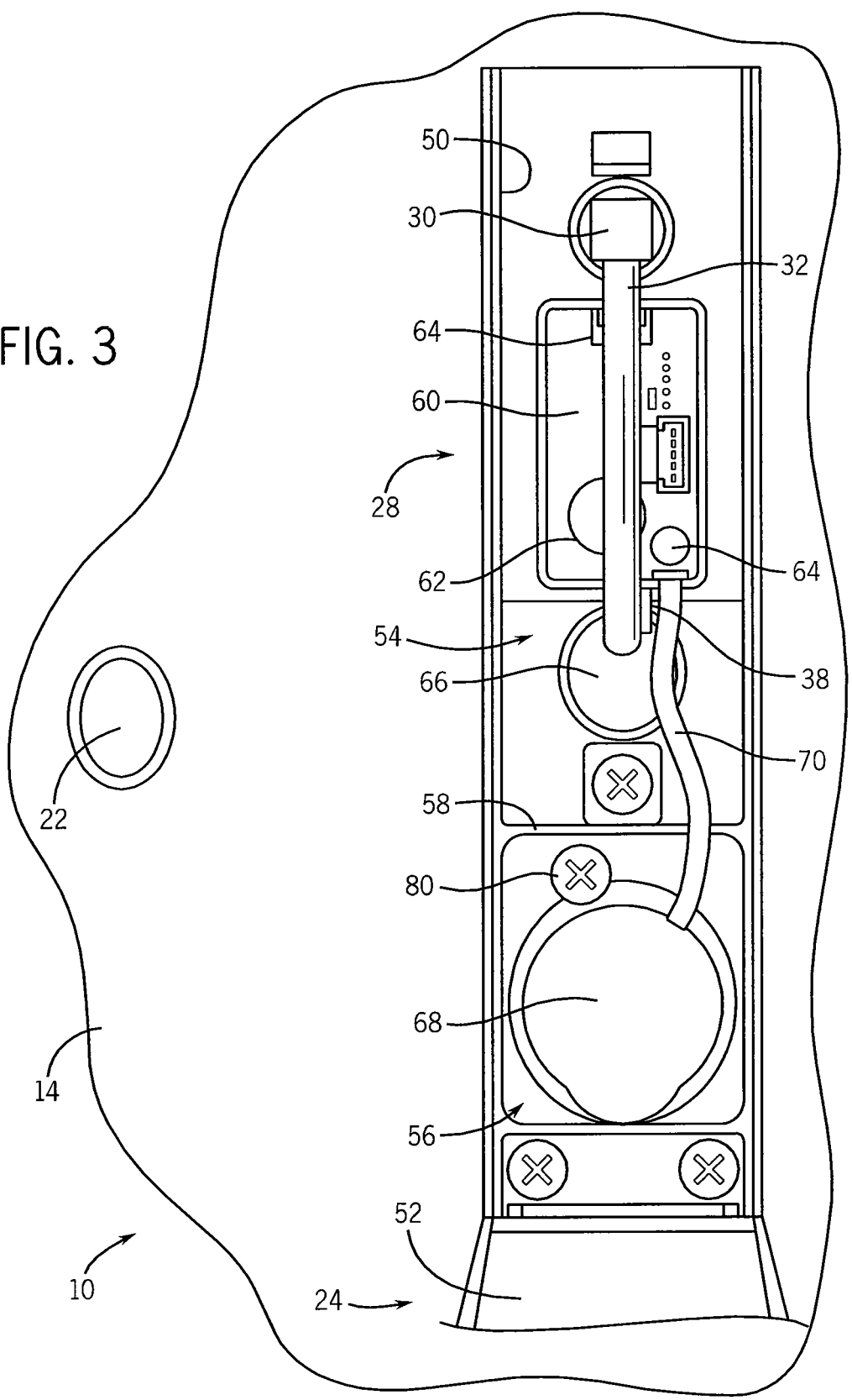
FIG. 3 is a top plan view of a portion of the lavatory system of FIG. 1 with a fill cap of the liquid soap vessel pivoted to an open position.

Turning now to FIG. 3, the soap dispensing assembly 24 includes the aforementioned spout 28, which has a lower housing portion 50 and a fill cap 52. In the illustrated embodiment, the fill cap 52 is pivotably mounted to a rearward portion of the lower housing portion 50, such that when the fill cap 52 is pivoted to an open position (as shown in FIG. 3) the lower housing portion 50 is exposed. The lower housing portion 50 generally defines a first cavity 54 and a second cavity 56 separated from each other by separator bar 58. The first cavity 54 effectively provides a housing for the electronics of the soap dispensing assembly 24; namely, sensor board 60 (to which sensor 36 is preferably mounted) and electronics for a human discernable alarm. In one embodiment, this alarm includes a buzzer 62 and a light-emitting diode ("LED") 64, both of which will be described more fully below.

Figure 4:
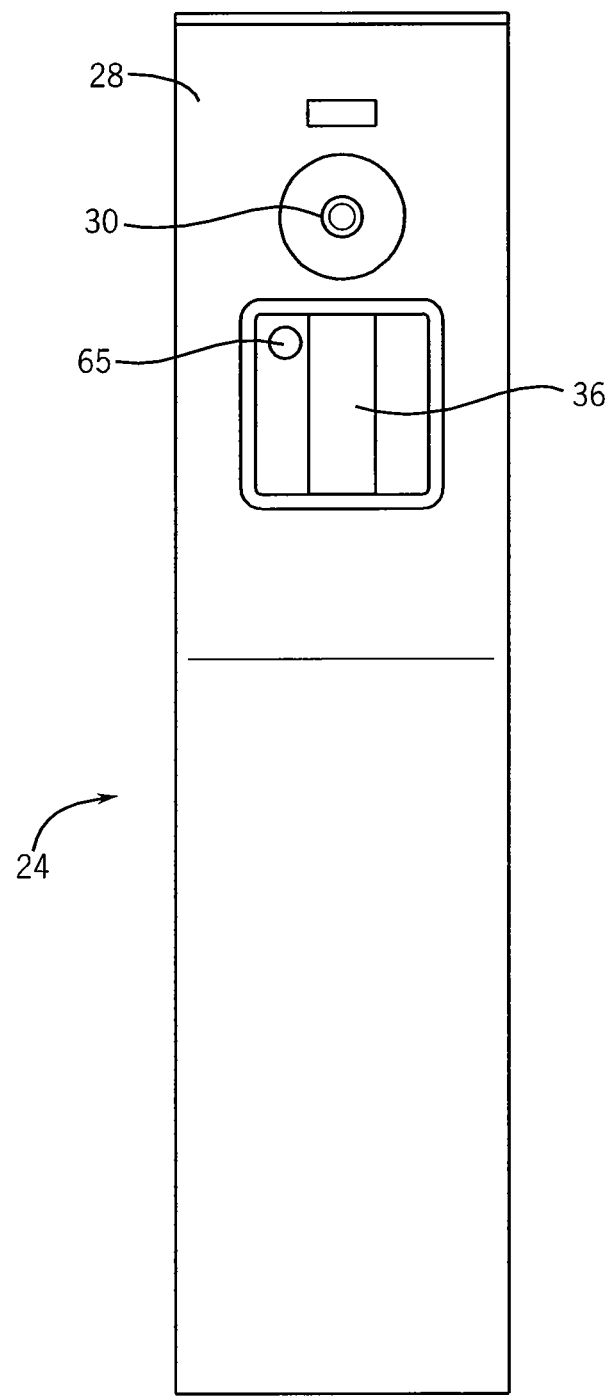
FIG. 4 is a bottom plan view of the spout of the liquid soap dispenser of the lavatory system.

As shown in FIG. 4, a low level indicator, e.g., warning light or LED 65, is preferably mounted to the opposite side of the sensor board 60 and is caused to illuminate when the liquid soap vessel 26 is at or near empty. LED 65 is viewable when fill cap 52 is in the closed position. The first cavity 54 also includes an opening 66 through which the tube 32 passes and connects to the nozzle 30. The opening 66 also allows the transmission line or wire 38 to be routed from the sensor board 60 to the pump 34. As also shown in FIG. 4, the proximity sensor 36 is mounted to the sensor board 60 and, as known in the art, is operative to sense an object, e.g., user's hand, to activate operation of the pump 34. As also known in the art, a window (not shown) may be mounted over the sensor 36 to protect the sensor 36.

Figure 5:
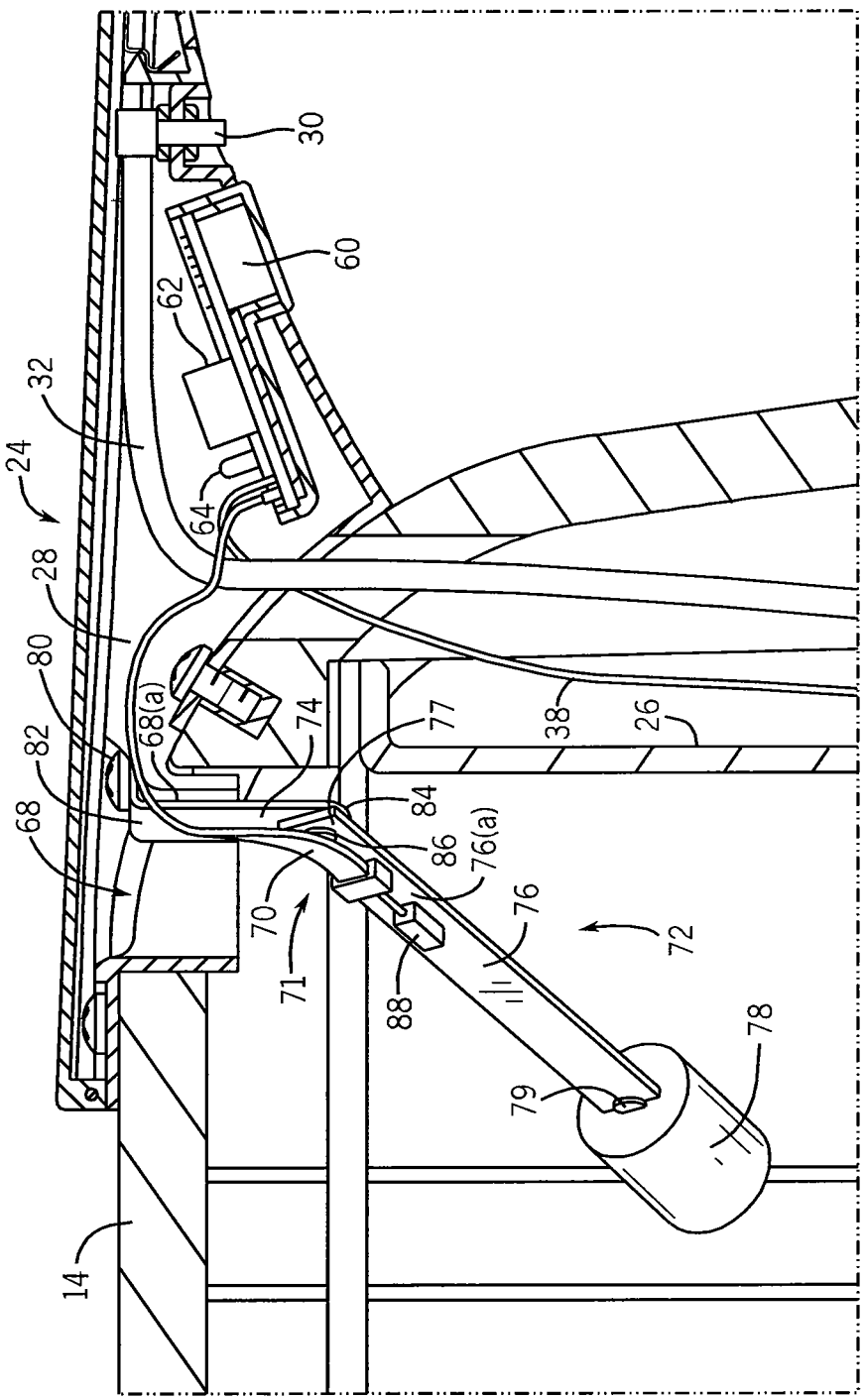
FIG. 5 is a section view of the lavatory system taken along line 5-5 of FIG. 1.

The second cavity 56 also has an opening 68 that opens to the liquid soap vessel 26, as best shown in FIG. 5, for refilling the liquid soap vessel 26. Thus, when refilling the liquid soap vessel 26, a service person simply pivots the fill cap 52 rearward (as shown in FIG. 3) to expose the fill opening 68. As will be described more fully below, a fluid level sensor measures a fill level in the liquid soap vessel 26 and provides corresponding fill level information to the sensor board 60 via wire ribbon 70. As will be explained more fully below, fill level information is used to alert service personnel when refilling of the liquid soap vessel 26 is needed, when the liquid soap vessel 26 is properly filled, or when an overflow condition is imminent.

Turning now to FIG. 5, as mentioned above, the liquid soap dispenser assembly 24 includes a fluid or fill level sensor assembly 72 operative to measure the liquid soap level in the liquid soap vessel 26. The fill level sensor assembly 72 includes an arm 71, which in the illustrated embodiment, is formed by an interconnected linkage comprised of a first and second link. Preferably the first and second links include a stationary link 74 and a pivoting link 76 pivotably coupled to the stationary link 74. More particularly, the pivoting link 76 has a first end 77 pivotably coupled to the stationary link 74 and a second end 79 to which a float 78 is coupled. The float 78 is formed of a material having a density less than liquid soap. In this regard, the float 78 will ride generally about the top surface of the liquid soap. In a preferred embodiment, the float 78 is formed of a non-absorbent material, such as a hard plastic.

The stationary link 74 extends generally along a vertical axis, and in a preferred embodiment, is mounted, such as by screw 80, to the lower housing portion 50 of the spout 28. The stationary link 74 has a planar upper end 82 that is attached to the spout 28 adjacent the fill opening 68 so that the vertical portion of the stationary link 74 sits generally against an inner wall 68(a) of the fill opening 68. The stationary link 74 has a lower end 84 that is pinned to the pivoting link 76 by pivot 86.

Attached to an exterior surface 76(a) of the pivoting link 76 is an accelerometer 88 that provides an output signal with a voltage that changes as the volume of liquid soap in the vessel 26 changes. In one embodiment, the printed circuit board used to mount the accelerometer 88 (and the associated electronics) is also the float-bearing member, i.e., pivoting link 76. This output signal is transmitted to the sensor board 60 via wire ribbon 70. As the liquid soap level in the vessel 26 changes, the position of the float 78 will also change. Since the float 78 is supported by the liquid soap in the vessel 26, as the volume of liquid soap in the vessel changes, the voltage output of the accelerometer 88 also changes. It will be appreciated that the accelerometer 88 may provide a digital or an analog output. For purposes of calibrating the accelerometer 88, the volume of liquid soap in the vessel 26 required to support the float 78 so that the pivoting link 76 is generally perpendicular to the stationary link 74 is considered the baseline volume and thus the stationary link 74, in effect, forms a fixed point of reference against which volume changes in the vessel 26 can be measured.

More particularly, the accelerometer 88 detects the displacement of a precision inertial mass constrained to move along a single axis (the accelerometer axis) when acted upon by an external force, and generates an output proportional to the displacement of that mass. The displacement of the mass is a function of the magnitude of the external force, and the orientation of the external force vector relative to the accelerometer axis. When the external force vector is aligned with the accelerometer axis, the displacement of the inertial mass will be a maximum; when the external force vector is perpendicular to the accelerometer axis, the inertial mass displacement will be a minimum, or zero.

Thus, the accelerometer 88, rigidly mounted to pivoting link 76, generates an output that varies predictably as the soap level in vessel 26 changes. The external force acting on the accelerometer 88 is the force due to gravity. Ignoring miniscule variations due to elevation and the earth's curvature, this force is constant in both magnitude and direction, and its orientation is fixed relative to stationary link 74. Because the accelerometer 88 is rigidly mounted to pivoting link 76, the orientation of the accelerometer axis is fixed relative to this link 76. As the soap level in vessel 26 changes, the angle of pivoting link 76 with respect to stationary link 74 changes, and the orientation of the accelerometer axis relative to the external force vector therefore changes in a manner completely defined by the trigonometric relationship among the several axes. Because the displacement of the accelerometer inertial mass is a function of the magnitude of the external force—which is constant—and the orientation of the external force vector relative to the accelerometer axis—which is trigonometrically related to the soap level in vessel 26, and the accelerometer output is proportional to this displacement, the accelerometer output varies predictably as the soap level in vessel 26 changes.

For a given installation, when the fill level within the liquid soap vessel is below ¼ full the liquid soap vessel will be deemed "empty." Thus, for a liquid soap vessel having a length that is two units and a depth that is one unit, when the angle between pivoting link 76 and stationary link 74 is 48.6 degrees below horizontal (when pivoting link 76 is exactly perpendicular to stationary link 74), the fill level within the liquid soap vessel will be approximately ¼ full.

The fill level sensor 72 could also be used to detect an overflow or overfilled condition. For example, if the output of the accelerometer 88 corresponds to an angular position above the horizontal, i.e., a negative angle, this would signal that the fill level in the liquid soap vessel 26 is such that the float 78 has caused the pivoting link 76 to move past the horizontal. Assuming that the horizontal was the maximum desired fill level, any angle above the horizontal would indicate that the liquid soap level is above desired levels. This can be used to signal to a service person that a maximum fill level has been reached to avoid overfilling of the liquid soap vessel 26.

It will be appreciated that the present invention is not limited to a liquid soap container having the dimensions used in the examples above. Moreover, the percentage-full levels to differentiate between full, empty, and overfilled in the examples above were used for illustrative purposes only and are not intended to the limit the invention. As such, it is contemplated that other values could be used to determine the "status" of the liquid soap vessel 26.

Figure 6:
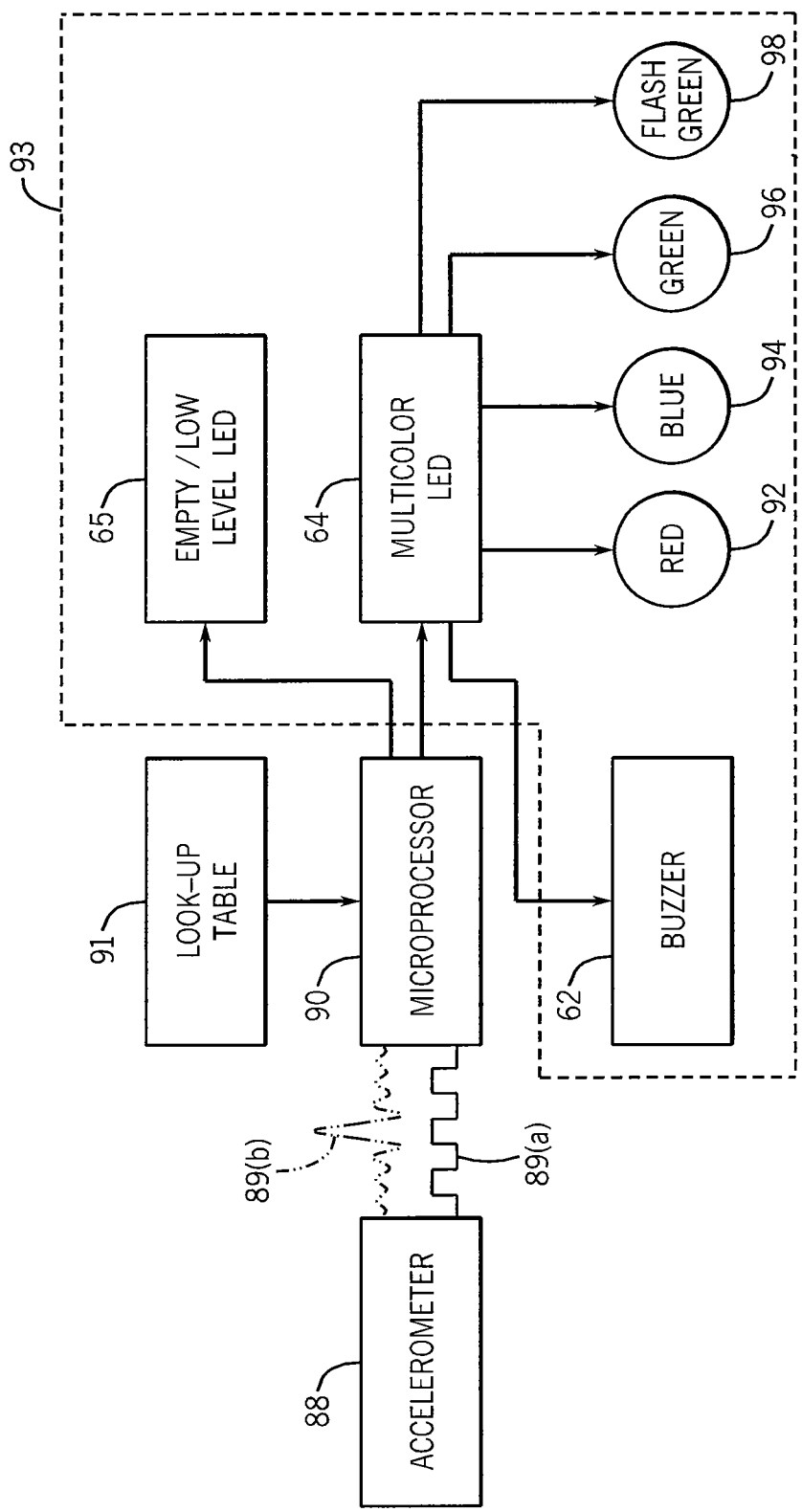
FIG. 6 is a schematic diagram of a fill level sensing and user feedback system according to another embodiment of the invention.

Turning now to FIG. 6, the output of the accelerometer 88 is provided to a processor, preferably microprocessor 90, which is carried by the sensor board 60. The accelerometer 88 preferably provides a digital output 89(a). Alternately, an accelerometer 88 that provides an analog output 89(b) could be used. The microprocessor 90 is configured to execute a series of instructions in response to the signals received from the accelerometer 88. More particularly, the microprocessor 90 executes the code to carry out a process of notifying service personnel as to the status of the liquid soap vessel 26. To do so, the microprocessor 90 reads the voltage level of the output signal of the accelerometer 88 and compares that value to data contained in a look-up table 91. From the correspondence between the readout voltage and the data in the look-up table, the microprocessor 90 selectively causes illumination of the multicolor LED 64.

In accordance with one embodiment of the invention, fill status information is conveyed in a human discernable form by a feedback system 93, which in one embodiment, includes a light or multicolor LED 64, low level indicator 65, and audible device, such as a buzzer 62. In a preferred embodiment, the multicolor LED 64 is capable of producing red, blue, and green light and low level indicator 65 is a red-only LED. In one embodiment, the LED 64 lights red 92 when the force detected by the accelerometer indicates that the float is at or below an "empty" level, i.e., greater than 48.6 degrees below horizontal. LED 65 is also caused to illuminate in such an instance, which allows a serviceperson to determine an empty status without lifting the fill cap. The LED 64 lights blue 94 when the fill level in the liquid soap vessel 26 is above the "empty" level but below "a reasonable fill level," e.g., a 20% full level. The LED 64 lights green 96 when the fill level is above the reasonable fill level but below the maximum fill level, e.g., angle at zero or pivoting link 76 at horizontal. Preferably, the microprocessor 90 causes the LED 64 to flash green 98 and sounds an audible alarm using buzzer 62 when the fill level is above the maximum fill level. Thus, if an overfill condition is imminent, a visual as well as audio signal is provided to the serviceperson to alert of the fill status.

From the foregoing, it will be appreciated that the accelerometer 88 outputs a signal having a voltage level that can be used by the processor 90 to determine the fill level within the vessel 26. The processor 90 determines the fill level within the liquid soap vessel 26 and illuminates the multicolor LED 64 accordingly. In one embodiment, the output voltage of the accelerometer 88 increases as the fill level in the vessel 26 decreases, and a baseline voltage, such as 1.65V, is used to indicate a filled condition. Thus, if the voltage output exceeds this baseline voltage, the microprocessor will deem the vessel 26 to be in an overfilled state and flash the multicolor LED 64 green. In one embodiment, if the fill level in the vessel 26 is between 100% full and approximately 60% full, the LED 64 will be illuminated solid green. For one exemplary accelerometer 88, an output voltage of approximately 1.85V corresponds to a 60% fill level. The LED 64 will be lit solid blue for fill levels between approximately 60% and approximately 20%. For the exemplary accelerometer 88, a 20% fill level corresponds to an output voltage of approximately 2.1V. When the accelerometer output voltage indicates that the fill level has dropped below approximately 20%, but is above approximately 5%, the LED 64 is caused to light solid red. For one exemplary accelerometer, a 5% fill level corresponds to an output voltage of approximately 2.3V. If the fill level falls below 5% (e.g., accelerometer output voltage greater than 2.3V), the LED 64 flashes red to indicate that the vessel is nearly exhausted of liquid soap.

It will be appreciated that the above ranges are merely exemplary and are not intended to limit the scope of the invention. The invention is also not limited to the use of a multicolor LED as an array of LEDs may also be used. Additionally, it is contemplated that a different illumination scheme described may be used to alert service personnel as to the fill status of the liquid soap vessel 26. Also, while a red-only LED has been described for providing a fill status when the spout is closed, it is understood that this second LED could be a multicolor LED similar to LED 64 and illuminate in a manner similar to that described herein.

Figure 7:
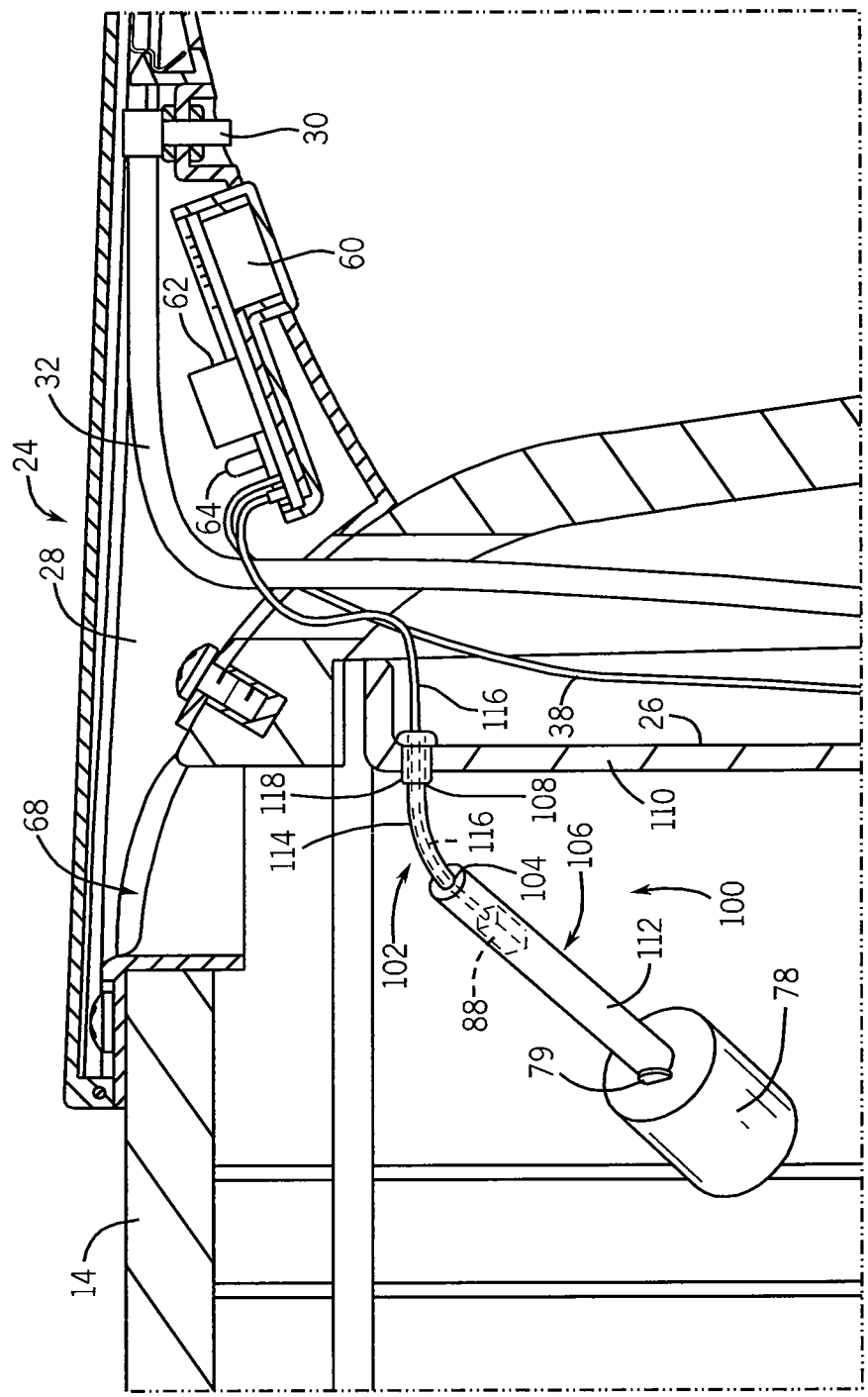
FIG. 7 is a section view of the lavatory system similar to that shown in FIG. 5 illustrating a fill level sensor assembly according to an alternate embodiment of the invention.

Turning now to FIG. 7, a fluid level sensor assembly 100 according to another embodiment of the invention is shown. In this embodiment, the arm is in the form of a flexible cable 102 having a first end 104 attached to a float-bearing member 106 and a second end 108 that is secured to the inner wall 110 of the soap vessel 26. Float 78 is attached to the end 79 of the float-bearing member 106 in a conventional manner. The float-bearing member 106 has elongated cylindrical housing 112 that provides an enclosure for the accelerometer 88 and the associated electronics (not shown). The flexible cable 102 is formed of flexible or pliable material that provides a sheathing 114 for transmission wires 116 that extend from the accelerometer 88 to the sensor board 60. As shown in FIG. 7, in a preferred embodiment, the second end 108 of the flexible cable 102 is attached to, and extends through, an upper end of the inner wall 110 of the soap vessel 26. More particularly, an opening (not shown) is formed in the upper end of the inner wall 110 and a grommet 118 is sealed to the inner wall 110 and defines a passage through which the transmission wires 116 can pass through the inner wall 110 of the vessel 26 to the sensor board 60. The sheathing 114 passes tightly through the opening in the grommet 118 to effectively attach the flexible cable 102 to the inner wall 110 of the soap vessel 26. This attachment forms a fixed point of reference against which the position of the float 78 can be measured to determine the level of liquid soap in the vessel 26. More particularly, as the level of liquid soap in the vessel 26 changes, the force measured by the accelerometer 88 changes and the output voltage of the accelerometer 88 changes accordingly. The microprocessor 90 can then compare the output voltage to values in a look-up table 91, for example, to determine the level of soap in the soap vessel 26.

While the invention has been described with respect to a wired connection between the accelerometer and the sensor board, it will be appreciated that wireless communication may also be used. The implementation of wireless communication devices and a localized power supply (e.g., battery) would allow the sensor to be totally enclosed within the vessel. In this regard, the invention could be used to measure fluid levels in pressurized vessels and other types of containers in which exposure to ambient conditions is undesirable.

Additionally, while the invention has been described with respect to an arrangement of LEDs, microprocessor, proximity sensor, and audible device on a shared sensor board, it is understood that the invention is not so limited.

As described above, it is contemplated that the accelerometer 88 may be mounted to a pivoting link 76 or a float bearing member 106. It is also contemplated that the pivoting link 76 or the float bearing member 106 may include a portion thereof made of circuit board material rather than having a circuit board mounted to the pivoting link 76 or the float bearing member 106. Additionally, it is contemplated that the pivoting link 76 or the float-bearing member 106, or at least the portions thereof containing the accelerometer 88, may be sealed and encased in fluid-impervious material to protect the accelerometer 88 and associated electronics from exposure to the liquid soap.

Further, while the invention has been described with respect to a liquid soap dispenser, it is understood that the fill level sensor could be used to detect the level within other types of fluid containers, such as fuel tanks, silos, etc.

Various alternatives are contemplated as being within the scope of the following claims particularly pointing out and distinctly claiming the subject matter regarded as the invention.

The invention claimed is:

1. A fluid level sensor comprising:
   a linkage having a first end and a second end, the first end configured to be attached to a reference point;
   a float attached to the second end; and
   an accelerometer attached to a surface of the linkage and operable to move with movement of the float, herein the accelerometer has a sensing axis and the accelerometer is operative to measure changes in the sensing axis orientation relative to a fixed external force vector acting on the float.

2. The fluid level sensor of claim 1 wherein the linkage includes a first link to which the that and the accelerometer is attached and a second link pivotally mounted to the first link, wherein the second link is configured to be non-pivotably attached to the reference point.

3. The fluid level sensor of claim 1 further comprising a visual and audible alarm for alerting to a low fluid level condition and an overfilled fluid level condition.

4. The fluid level sensor of claim 3 where the alerting means includes at least one of an LED and a buzzer.

5. The fluid level sensor of claim 1 further comprising a feedback system communicatively linked with the accelerometer and operable to provide a human discernable indicator of a level of soap within a vessel.

6. The fluid level sensor of claim 5 wherein the feedback system includes at least one of an audible indicator and a light.

7. The fluid level sensor of claim 6 wherein the feedback system is configured to at least one of a sound the audible indicator or an illumination of the light if the level of soap within the vessel is above a predetermined fill level.

8. The fluid level sensor of claim 7 wherein the predetermined level is adjustable by reprogramming the feedback system.

9. The fluid level sensor of claim 1 wherein the linkage includes a stationary link and a pivoting link pivotably mounted to the stationary link, and wherein the accelerometer is mounted to the pivoting link and is configured to measure an angle of the pivoting link relative to the stationary link.

10. A fluid level sensing system comprising:
a vessel configured to contain a fluid level sensor;
a linkage within the vessel having a first end and a second end, the first end configured to be attached to a reference point of the vessel;
a float attached to the second end of the linkage;
an accelerometer attached to a surface of the linkage and operable to move with movement of the float, wherein the accelerometer has a sensing axis and the accelerometer is operative to measure changes in the sensing axis orientation relative to a fixed external force vector acting on the float; and
a fill status feedback system with a low fluid level indicator.

11. The fluid level sensing system according to claim 10 wherein an overfilled condition of the vessel is sensed by an output of the accelerometer corresponding to an angular position above a horizontal axis, and wherein the output signals that a fill level in the vessel is such that the float has caused the linkage to move past the horizontal axis.

12. A fluid level sensing system comprising:
a vessel configured to contain a fluid level sensor;
a linkage within the vessel having a first end and a second end, the first end configured to be attached to a reference point of the vessel;
a float attached to the second end of the linkage;
an accelerometer attached to a surface of the linkage and operable to move with movement of the float, wherein the accelerometer has a sensing axis and the accelerometer is operative to measure changes in the sensing axis orientation relative to a fixed external force vector acting on the float; and
wherein the accelerometer outputs a voltage that increases as the external force vector increases.

13. The fluid level sensing system according to claim 12 wherein a displacement of an inertial mass of the float is a function of a magnitude of the external force vector, and the orientation of the external force vector relative to the accelerometer axis is trigonometrically related to the fluid level in a vessel, and an accelerometer output is proportional to a displacement of the float, thus resulting in the accelerometer output varying as the soap level in the vessel changes.

14. The fluid level sensing system according to claim 12 wherein the fluid level sensor is configured to sense an overfilled condition of a fluid within the vessel such that the linkage is pivoted by the float to create an angle above a horizontal plane when the float is displaced by the fluid within the vessel.

\* \* \* \* \*